(12) United States Patent
Rollender

(10) Patent No.: US 7,970,406 B2
(45) Date of Patent: *Jun. 28, 2011

(54) METHOD FOR TRANSFERRING DATA

(75) Inventor: Douglas H. Rollender, Bridgewater, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1753 days.

This patent is subject to a terminal disclaimer.

(21) Appl. No.: 10/602,588

(22) Filed: Jun. 25, 2003

(65) Prior Publication Data

US 2004/0005895 A1    Jan. 8, 2004

Related U.S. Application Data

(63) Continuation of application No. 09/260,734, filed on Mar. 3, 1999, now Pat. No. 6,603,974.

(51) Int. Cl.
*H04W 40/00*      (2009.01)

(52) U.S. Cl. ............... 455/445; 455/411; 455/422.1; 455/551; 455/435.1

(58) Field of Classification Search ............ 455/418, 455/428, 435.1, 445, 551, 466, 422.1, 411
See application file for complete search history.

(56) References Cited

U.S. PATENT DOCUMENTS

| | | | |
|---|---|---|---|
| 5,297,183 A | 3/1994 | Bareis et al. | |
| 5,337,345 A | 8/1994 | Cassidy et al. | |
| 5,526,401 A | 6/1996 | Roach, Jr. et al. | |
| 5,544,225 A | 8/1996 | Kennedy, III et al. | |
| 5,546,444 A | 8/1996 | Roach, Jr. et al. | |
| 5,594,740 A | 1/1997 | LaDue | |
| 5,729,537 A * | 3/1998 | Billstrom | 370/329 |
| 5,873,043 A | 2/1999 | Comer | |
| 5,887,251 A | 3/1999 | Fehnel | |
| 5,946,630 A | 8/1999 | Willars et al. | |
| 6,154,648 A | 11/2000 | Comer | |
| 6,188,899 B1 | 2/2001 | Chatterjee et al. | |
| 6,505,058 B1 * | 1/2003 | Willey | 455/574 |
| 2004/0152482 A1 * | 8/2004 | Raffel et al. | 455/522 |

FOREIGN PATENT DOCUMENTS

| | | |
|---|---|---|
| EP | 0 825 751 | 2/1998 |
| EP | 0859531 | 8/1998 |
| WO | 9523487 | 8/1995 |
| WO | 98/06227 | 2/1998 |
| WO | 98/09425 | 3/1998 |
| WO | 98/32300 | 7/1998 |

OTHER PUBLICATIONS

Non Patent Literature (Mobile IP by James D. Solomon, 1998 Prentice Hall PTR, Prentice Hall, Inc., pp. 54-55.*

* cited by examiner

*Primary Examiner* — Nghi H Ly
*Assistant Examiner* — Inder P Mehra
(74) *Attorney, Agent, or Firm* — Harness, Dickey & Pierce, P.L.C.

(57) ABSTRACT

The method for transferring data sends the data as part of first and second permanent identifiers during a communication procedure prior to establishing a traffic channel in the communication system. Besides the data, the first permanent identifier includes routing information to a home system forming part of the communication system. The second permanent identifier is an expanded permanent identifier with the data forming at least part of the expanded portion thereof. Based at least on recognizing a portion of the second permanent identifier, a home system sends the first and second permanent identifiers to a destination entity. The destination entity extracts the data from the first and second permanent identifiers. In this manner, a traffic channel does not need to be established to transmit the data.

32 Claims, 3 Drawing Sheets

METHOD FOR TRANSFERRING DATA

RELATED APPLICATIONS

This application is a continuation of application Ser. No. 09/260,734, filed on Mar. 3, 1999 now U.S. Pat. No. 6,603,974, the entire contents of which are hereby incorporated by reference for which priority is claimed under 35 U.S.C. §120. The following applications, filed concurrently with application Ser. No. 09/260,734, are related to the subject application: application Ser. No. 09/260,734 entitled METHOD FOR TRANSFERRING DATA by the inventor of the subject application; application Ser. No. 09/261,735 entitled METHOD FOR TRANSFERRING DATA USING EXPANDED PERMANENT IDENTIFIER by the inventor of the subject application; and application Ser. No. 09/261,737 entitled METHOD FOR TRANSFERRING DATA USING PERMANENT IDENTIFIER INCLUDING ROUTING INFORMATION by the inventor of the subject application.

BACKGROUND OF THE INVENTION

1. Field of the Invention

The present invention relates to the field of communication; and more particularly, a method for transferring data.

2. Description of Related Art

FIG. 1 illustrates a logical block diagram of a conventional communication system that provides mobility. This logical block diagram represents either wireless or wireline (or landline) communication systems that provide subscriber mobility. As shown, an end user 2 communicates with a destination entity 6 via a first communication device 4, a-serving system 12, a network 14, a home system 16, and a second communication device 8. The end user 2 represents an entity (human, system or machine) which generates information for communication to the destination entity 6 (also a human, system or machine).

The first communication device 4 represents a device for interfacing with the serving system 12. For instance, taking wireless communication as an example, the serving system 12 includes any number of base stations, mobile switching centers, authentication centers, etc. to provide wireless communication services for a coverage area in which the communication device 4 is located, and the communication device 4 represents a mobile station. Continuing with the wireless communication example, the network 14 presents a public or private communication network such as the Public Switch Telephone Network, a public packet network or a private packet network, and the home system 16 represents the wireless communication service provider with whom the user of the mobile station (i.e., the communication device 4) has established an agreement to provide mobile wireless communication services. Accordingly, the home system 16, like the serving system 12, also includes any number of base stations, mobile switching centers, authentication centers, etc. to provide mobile wireless communication services for a coverage area. Because a particular mobile wireless communication service provider has a limited coverage area, service providers having different coverage areas establish roaming agreements to serve each other's customers. In this example, the second communication device 8 could be a mobile station or wireline connection to the home system 16. Alternatively, in this example or any other embodiment, the second communication device 8 is connected to the home system 16 via a network such as the network 14. As a further alternative, the second communication device 8 forms part of the home system 16.

As an example of how FIG. 1 represents a wireline mobile communication system, the serving system 12 represents the landline mobile communication service provider for the location in which the communication device 4 is located, the network 14 represents, for example, a long distance landline carrier, and the home system 16 represents another landline mobile communication service provider with whom the end user 2 has established an agreement to provide landline mobile communication services. The first communication device 4 could then represent an intelligent or programmable phone. One embodiment of an intelligent phone allows the end user 2 to place a programmed integrated circuit card into the intelligent phone, and convert the intelligent phone into the end user's personal phone. Namely, the programmed integrated circuit card provides the intelligent phone with the subscriber information for the end user 2 such that communication of this information to the serving system 12 and communication between the serving system 12 and the home system 16 allows, for example, (1) calls to the end user 2 to be routed to the intelligent phone (i.e., communication device 4) or (2) the end user 2 to originate calls in the serving system 12 as if he were still in the area served by the home system 16.

The wireline and wireless examples given above provide only two examples of the many possible mobile communication systems represented by FIG. 1.

The mobile communication systems represented by the logical block diagram of FIG. 1 present various challenges to the serving system 12 and the home system 16 which want to provide communication services only to valid users and receive appropriate payment for having provided those services. Accordingly, each communication system has associated therewith numerous different standards and protocols for ensuring that the above mentioned goals are achieved.

The most prevalent techniques employed by these standards utilize permanent identifiers associated with the end user 2. One of the identifiers is assigned by the home system 16, and is referred to hereinafter as the first permanent identifier. The first permanent identifier includes two portions. The first portion includes routing information to the home system 16, and identifies the home system 16 with which the serving system 12 should communicate. The second portion of the first permanent identifier identifies the end user 2 to the home system 16, and is often an identification number. Many wireless communication standards refer to the first permanent identifier as the mobile station identifier (MSID).

An example of the first permanent identifier is the International Mobile Station (or Subscriber) Identification (IMSI) specified by the International Telecommunication Union—Telecommunication Sector (ITU-T) Recommendation E.212. The format of the IMSI is given below:

IMSI (up to 15 digits)=MCC (3 digits)+MNC (1 to 3 digits)+MSIN (9-11 digits)

The mobile country code (MCC) forms the first three digits of the IMSI and identifies the country in which the home system 16 is located. Together with the mobile network code (MNC), which forms the next 1 to 3 digits, the MCC forms a home system code identifying the home system 16. Communication standards in the United States often refer to this home system code as the home network identifier (HNI). The next 9-11 digits form the identification number pre-assigned to the end user 2 by the home system 16.

Another permanent user identifier (hereinafter "the second permanent identifier"), while known by the home system 16 and associated with the end user 2, is not necessarily assigned by the home system 16. This identifier is also associated in some manner with the first communication device 4 or a portion thereof being used by the end user 2. In a mobile wireless communication system, the second permanent identifier could be the electronic serial number (ESN) of the mobile station serving as the first communication device 4. In a wireline mobile communication system such as the intelligent phone example discussed above, the second permanent identifier could be the serial number of the programmed integrated circuit card. The second permanent identifier could even be the phone number of, for example, and integrated services digital network (ISDN) phone.

There are plans to expand the second permanent identifier in the future. The expanded second permanent identifier includes three portions. The first and second portions generally represent the unexpanded second permanent identifier, while the third portion represents the expanded portion of the second permanent identifier. The first portion includes a code. When that code is a pre-established code, the expanded second permanent identifier is triggered. Accordingly, this technique permits use of either unexpanded or expanded second permanent identifiers. If the expanded second permanent identifier is triggered, the system or device receiving the first and second portions of the expanded second permanent identifier will expect the third portion to follow, and if the third portion is not received, a request therefor will be generated.

When the first portion of the second permanent identifier does not include the pre-established code, the first portion represents a first identification number as in the unexpanded second permanent identifier. The second portion of the second permanent identifier, and also the expanded second permanent identifier, includes a second identification number. The expanded portion represents a third identification number.

An example of an expanded second permanent identifier is the expanded ESN (EESN) currently being proposed for wireless communication. The format of the EESN is given below:

EESN (56 bits)=ESN (32 bits)+ESN-expansion (24 bits)

ESN (32 bits)=manufacturer's code of 128 (8 bits)+ identification number (24 bits)

ESN-expansion=expanded manufacture's code (24 bits)

When the manufacturer's code is 128, the expanded ESN is triggered.

The home system 16 typically stores the first and expanded second permanent identifier pair for each subscriber such as the end user 2. When communicating with the serving system 12, the communication device 4 supplies the first and expanded second permanent identifiers to the serving system 12. Based on the routing information in the first permanent identifier, the serving system 12 knows to communicate with the home system 16 to, for example, validate the end user 2. To validate the end user 2, the serving system 12 provides one or both of the first and expanded second permanent identifiers to the home system 16. Typically, if the home system 16 receives only one of these identifiers, the home system 16 will request the other identifier from the serving system 12. Furthermore, if an expanded second permanent identifier is supplied without the third or expanded portion, the home system 16 will request the expanded portion.

If both the first and expanded second permanent identifiers provided by the serving system 12 match a corresponding first and expanded second permanent identifier pair stored at the home station 16, the home station 16 validates the end user 2. This process may be used as part of a procedure to verify (for billing purposes) or authenticate (to eliminate fraud) the end user 2 as well. Referring again to the wireless example, this validation process is typically performed as part of the registration procedure included in most wireless communication standards.

Once validated, the serving system 12 provides communication services to the end user 2. For example, in a wireless system, a serving system 12 will open a traffic channel to a valid mobile station upon receiving such a request from the mobile station by the end user 2 originating the call. Having opened this traffic channel, the end user 2 can now transmit data to the destination entity 6.

A need, however, exists for end users to more efficiently transmit data than available through the lengthy process of requesting and establishing a traffic channel.

SUMMARY OF THE INVENTION

The method for transferring data according to the present invention forms a first permanent identifier associated with an end user (human, system or machine) in a mobile communication system. The first permanent identifier includes routing information to a home system in the mobile communication system, and also includes data associated with the end user in a predetermined portion thereof. An expanded permanent identifier is also formed. The expanded portion of the expanded permanent identifier includes data, and another portion thereof, associated in some manner with the end user, serves to identify the end user. A communication device in the mobile communication system used by the end user sends the expanded permanent identifier and the first permanent identifier, both destined for the home system.

Based on the expanded permanent identifier, a home system can recognize the end user associated with a received first and expanded permanent identifier pair, and at least in accordance with this recognition, sends the first and expanded permanent identifier to destination entity (human, system or machine). The destination entity extracts the data from the first and expanded permanent identifier. In this manner data is transferred from the end user to the destination entity over the mobile communication system without having to establish a traffic channel.

DETAILED DESCRIPTION OF THE DRAWINGS

The present invention will become more fully understood from the detailed description given below and the accompanying drawings which are given by way of illustration only, wherein like reference numerals designate corresponding parts in the various drawings, and wherein.

DETAILED DESCRIPTION OF THE PREFERRED EMBODIMENTS

The method of transferring data using the conventional communication system illustrated in FIG. 1 will be described in connection with FIG. 5. Accordingly a description of the elements illustrated in FIG. 1 will not be repeated.

Figure 1:
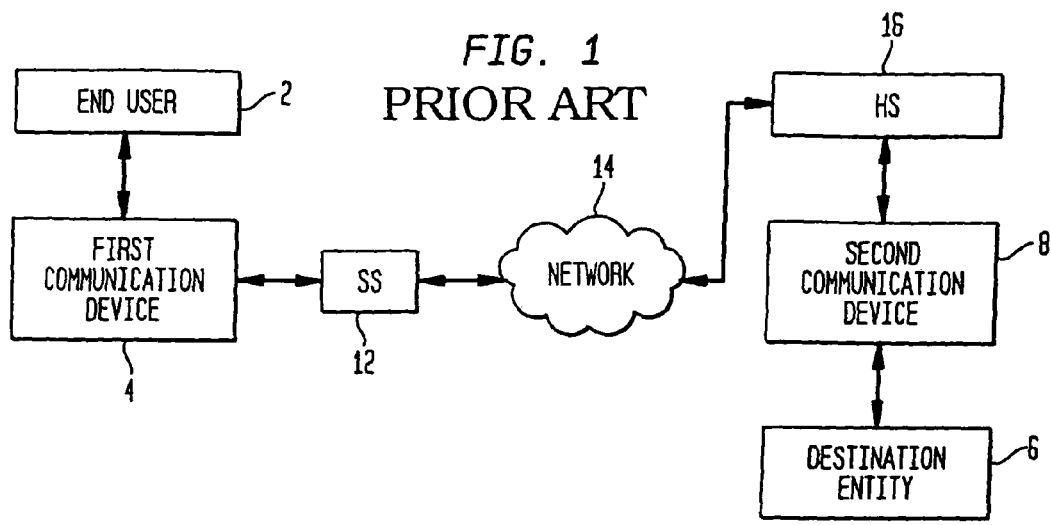
FIG. 1 illustrates a logical block diagram of a conventional communication system.

As discussed above, the numerous standards and protocols associated with the many mobile communication systems represented by FIG. 1 will employ a first permanent identifier and an expanded second permanent identifier. To transmit data, the communication device 4 initiates a procedure within the standard or protocol that requires the transfer of the first and expanded second permanent identifiers. For example, in a mobile wireless communication system, many standards require that the mobile station transmit the first and expanded second permanent identifiers as part of the registration procedure.

Figure 5:
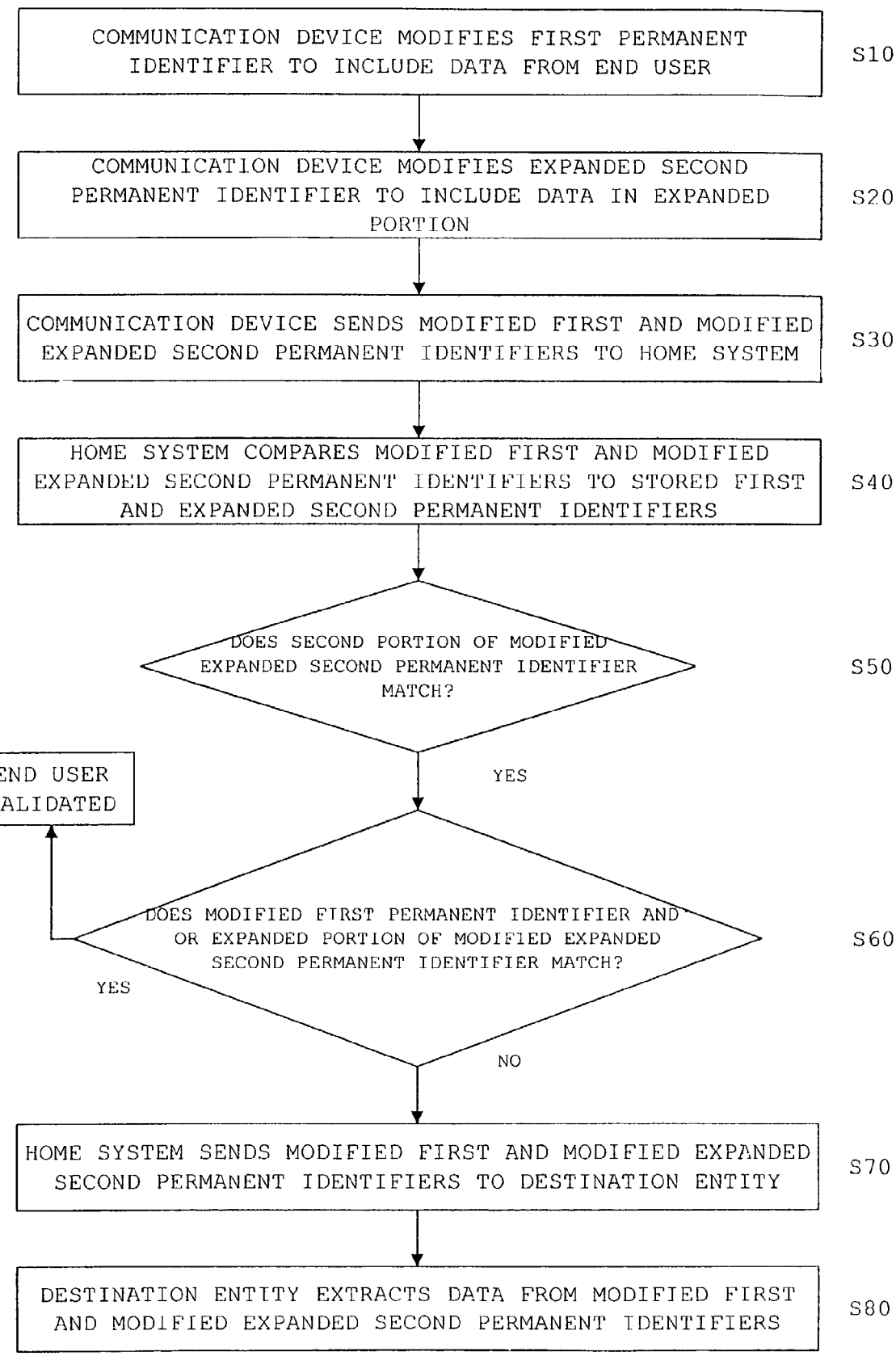
FIG. 5 illustrates a flowchart of a method of transferring data according to the present invention.

However, in steps S10 and S20 of FIG. 5, the communication device 4 forms modified first and modified expanded second permanent identifiers, respectively, prior to transmission. Alternatively, the end user 2 supplies the communication device with the modified first and modified expanded second permanent identifiers. The term modified has been used here to denote a difference between the first and expanded second permanent identifiers created according to the present invention and their conventional counterparts, and does not necessarily mean that either the communication device 4 or the end user 2 modified existing first and expanded second permanent identifiers; although the present invention is contemplated as covering this alternative as well.

The first portion of the modified first permanent identifier contains the routing information to the home system 16, but the second portion or a part thereof, which normally includes the user identification number pre-assigned by the home system 16, includes data from the end user 2.

The first portion of the modified expanded second permanent identifier includes the pre-established code to trigger the expanded second permanent identifier, and the second portion includes an identification number as did the conventional expanded second permanent identifier. However, the third or expanded portion of the modified expanded second permanent identifier, which normally includes another identification number, includes data from the end user 2.

For instance, when the IMSI is the first permanent identifier, the modified IMSI has the format given below:

IMSI (up to 15 digits)=MCC (3 digits)+MNC (1-3 digits)+data (9-11 digits).

And, when the EESN is the expanded second permanent identifier, the modified EESN has the format given below:

EESN (56 bits)=ESN (32 bits)+ESN-expansion (24 bits)

ESN (32 bits)=manufacturer's code of 128 (8 bits)+ identification number (24 bits)

ESN-expansion=data (24 bits)

As part of the initiated procedure, the serving system 12 supplies the modified first and modified expanded second permanent identifiers to the home system 16, as shown in step S30, via the network 14 and the second communication device 8. If the serving system 12 only supplies one of the modified first and modified expanded second permanent identifiers, the home system 16 requests the other identifier. If the home system 16 does not receive the expanded portion of the modified expanded second permanent identifier, the home system 16 requests the expanded portion from the serving system 12.

In step S40, the home system 16 compares the modified first and modified expanded second permanent identifiers to stored first and expanded second permanent identifier pairs.

If, in step S50, the home system 16 finds a match between the second portion of the received modified second permanent identifier and a second portion of a stored expanded second permanent identifier, but, in step S60, the received modified first permanent identifier and/or expanded portion of the received modified expanded second permanent identifier does not match the stored counterpart associated with the matching, stored second portion of the expanded second permanent identifier, then the home system 16 recognizes that the received modified first permanent and the received modified expanded second permanent identifiers store data. When the home system 16 recognizes that the received modified first and modified expanded second permanent identifiers store data, the home system 16 sends the received modified first and modified expanded second permanent identifiers to the destination entity 6 associated with the matching stored second portion of the expanded second permanent identifier via the second communication device 8, according to step S70. The home system 16 also fails to validate the first communication device 4 for the serving system 12. As a result, the serving system 12 has the option to deny service to the first communication device 4.

Based on the received modified first permanent identifier, the destination entity 6 recognizes that the received modified first and modified expanded second permanent identifiers originated from the end user 2. Furthermore, because the modified first permanent identifier and/or the modified expanded second permanent identifier does not match the respective first permanent identifier and/or expanded second permanent identifier for the end user 2, the destination entity 6 recognizes the modified first and modified expanded second permanent identifiers as containing data. Alternatively, simply receiving the identifiers from the home system 16 causes a recognition that the modified first and modified expanded second permanent identifiers contain data. In step S80, the destination entity 6, having recognized that the modified first and modified expanded second permanent identifiers contain data, extracts the data.

As one skilled in the art will appreciate, the method according to the present invention allows an end user 2 to transfer data to a destination entity without having to request and establish a traffic channel.

Figure 2:
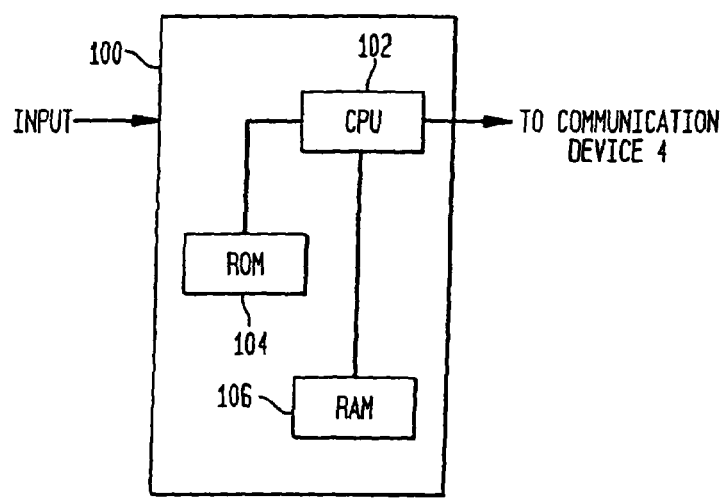
FIG. 2 illustrates a logical block diagram of a system embodiment for the end user in FIG. 1.

As discussed previously, the end user 2 can be a human, system or machine. For instance, the end user 2 may be an end user system as shown in FIG. 2. FIG. 2 illustrates a logical block diagram of an end user system 100. As shown, an end user system 100 includes a first central processing unit (CPU) 102 connected to a first read-only memory (104) and a first random access memory (106). The first CPU 102 performs some function in accordance with received input based on a predetermined program stored in the first ROM 104. Intermediate and final processing results are stored in the first RAM 106. According to the programming stored in the first ROM 104, the first CPU 102 transfers data to the communication device 2 for transmission.

As one skilled in the art will appreciate, the end user system 100 could be any of a plurality of end user systems, such as an automated teller machine, a sensing or measuring device (e.g., gas or electric meter), a vending machine, a vehicle, an autonomous vehicle, a robot, a security alarm system, an environmental or weather tracking system, etc., which receive input in some fashion, such as from a human or sensor(s). Consequently, a need exists for the end user system 100 to transfer data accumulated in the processing of its function to a remotely located destination entity 6 associated therewith.

As a more specific example, the end user system 100 could be a vehicle tracking device measuring the distance traveled by the vehicle and detecting the location of the vehicle. By means of the first communication device 4, the serving system 12, the network 14, the home system 16 and the second communication device 8, the end user system 100 transfers data on distance and location to the destination entity 6 according to the method of the present invention.

In an alternative embodiment, the first communication device 4 forms a part of the end user system 100 or the end user system 100 forms a part of the first communication device 4. In a possible mobile wireless communication system, the first communication device 4 is a mobile station, and the mobile station forms part of the end user system 100.

Figure 3:
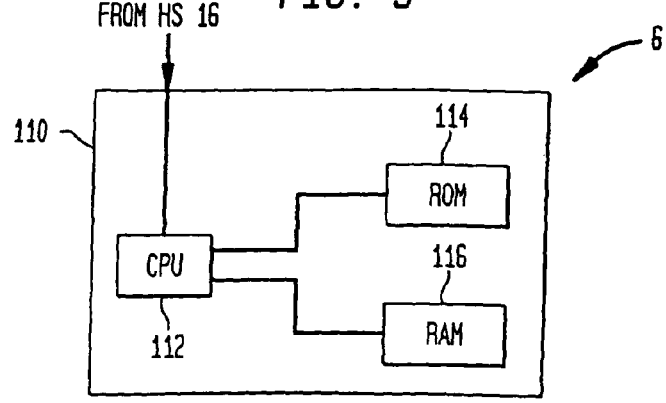
FIG. 3 illustrates a logical block diagram of a system embodiment of the destination entity in FIG. 1.

As also discussed previously, the destination entity 6 could be a human, system or machine. For instance, the destination entity 6 may be the processing system 110 shown in FIG. 3. As shown, the processing system 110 includes a second CPU 112 connected to a second ROM 114 and a second RAM 116. The second CPU 112 performs processing functions in accordance with a predetermined program stored in the second ROM 114, and stores intermediate and final processing results in the second RAM 116.

Continuing with the vehicle tracking example, the processing system 110 is a processing system for a transport company that extracts the data transferred thereto by the end user system 100, and uses the extracted data to, for example, prepare appropriate billing of the customer.

As an alternative, the second communication device 8 could form part of the destination entity 6, or the destination entity 6 could form part of the second communication device 8.

Furthermore, the home system 16 could communicate directly with the destination entity 6 via a communication line (e.g., fiber optic, cable, etc.); thus, eliminating the second communication device 8. The second communication device 8 could also be eliminated in another alternative embodiment wherein the destination entity 6 forms part of the home system 16 or the home system 16 forms part of the destination entity 6.

As a further alternative, and preferably as part of the embodiment wherein the destination entity 6 forms a part of the home system 16 or the home system 16 forms a part of the destination entity 6, the home system 16 does not store any first permanent identifiers. Instead, the home system 16 does not expect to ever validate the end user 2 so that communication services can be provided thereto. The home system 16 expects only to receive data from the end user 2. Accordingly, when the home system 16 receives a modified expanded second permanent identifier having a second portion that matches a second portion of a stored expanded second permanent identifier, the home system 16 sends the modified first and modified expanded second permanent identifiers to the destination entity 6.

Figure 4:
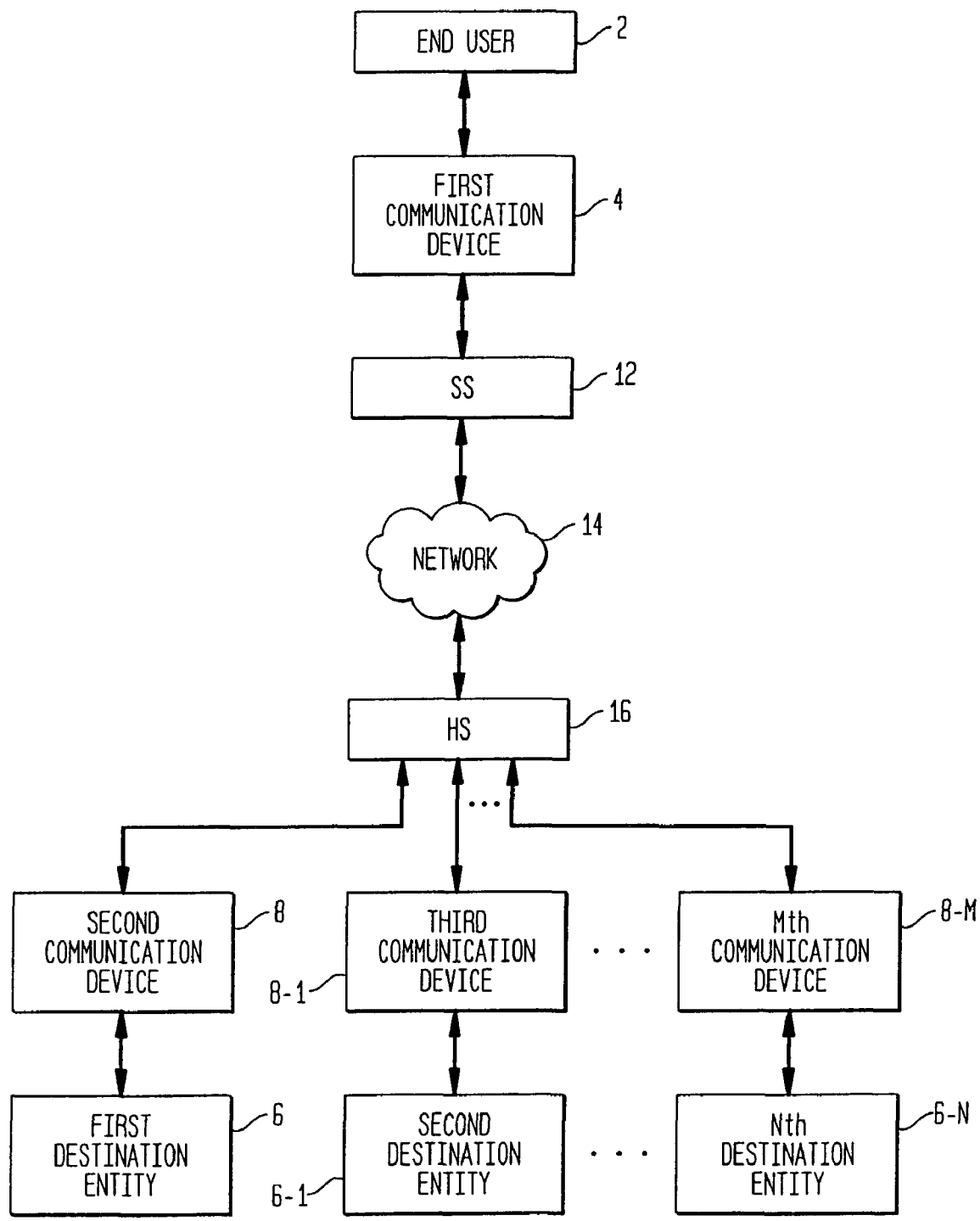
FIG. 4 illustrates a logical block diagram of an embodiment of a communication system according to the present invention.

FIG. 4 illustrates another logical block diagram of a mobile communication system according to the present invention. The embodiment of FIG. 4 is the same as that shown in FIG. 1 except for the addition of (1) third—Mth communication devices 8-1, . . . , 8-M connected to the home system 16 and (2) second—Nth destination entities 6-1, . . . , 6-N connected to the third—Mth communication devices 8-1, . . . , 8-M.

In this embodiment, the home system 16 supports multiple destination entities 6, 6-1, . . . , 6-N. The home system 16 stores a unique address for each of the first—Nth destination entities 6, 6-1, . . . , 6-N. Accordingly, to properly direct data to one of the first—Nth destination entities 6, 6-1, . . . , 6-N the end user 2 or communication device 4 modifies the second portion of the modified first permanent identifier or the expanded portion of the modified expanded second permanent identifier such that a predetermined part thereof includes the unique address of the intended destination entity recipient. The remaining parts of (1) the second portion of the modified first permanent identifier or (2) the expanded portion of the modified expanded second permanent identifier are then available for sending data.

For example, assume ten or less destination entities are supported by the home system 16 such that a single digit could be used to uniquely identify the destination entities. Also assume for the purposes of this example that the first permanent identifier is the IMSI. Then, the modified IMSI could have the format given below:

IMSI(up to 15 digits)=MCC(3 digits)+MNC(1-3 digits)+unique destination entity identifier or address(1 digit)+data(8-10 digits).

While in this example, the unique destination entity identifier is shown as forming the first part of the second portion of the modified first permanent identifier, the unique destination entity may form any part of the second portion of the modified first permanent identifier or any part of the expanded portion of the modified expanded second permanent identifier.

When handling a received modified first and modified expanded second permanent identifier pair wherein the second portion of the received modified expanded second permanent identifier matches the second portion of an expanded second permanent identifier stored at the home system 16, the home system 16 obtains the destination entity identifier in the predetermined part of the second portion of the modified first permanent identifier or in the predetermined part of the expanded portion of the modified expanded second permanent identifier. The home system 16 then sends the modified first and modified expanded second permanent identifiers to the destination entity 6, 6-1, . . . , 6-N identified by the destination entity identifier.

As an alternative, the second communication devices 8, 8-1, . . . , 8M could form part of the destination entities 6, 6-1, . . . , 6-N or the destination entities 6, 6-1, . . . , 6-N could form part of the second communication devices 8, 8-1, . . . , 8-M.

Furthermore, the home system 16 could communicate directly with one or more of the destination entities 6, 6-1, . . . , 6-N via a communication line (e.g., fiber optic, cable, etc.); thus, eliminating one or more of the second communication devices 8, 8-1, . . . , 8-M. The second communication devices 8, 8-1, . . . , 8-M could also be eliminated in another alternative embodiment wherein the destination entities 6, 6-1, . . . , 6-N form part of the home system 16.

While most of the examples given with respect to the present invention have been of wireless mobile communication systems, one skilled in the art will recognize from the forgoing disclosure that the present invention also applies to wireline mobile communication systems.

The invention being thus described, it will be obvious that the same may be varied in many ways. Such variations are not to be regarded as a departure from the spirit and scope of the invention, and all such modifications are intended to included within the scope of the following claims.

I claim:

1. A method of transferring data in mobile communication system, comprising:

receiving data in a communication device, the received data to be transferred to a destination entity;

forming a modified first permanent identifier including a first portion that includes routing information to a home system and a second portion that includes one portion of the received data, the second portion not being an identification number of a user;

forming a modified expanded second permanent identifier having a second permanent identifier portion and an expanded portion, the expanded portion including a second portion of the received data, the expanded portion not being an identification number of the user;

sending, from a communication device, at least the modified first permanent identifier and the modified expanded second permanent identifier.

2. The method of claim 1, wherein the receiving data step receives data from a user of the communication device.

3. The method of claim 1, wherein the receiving data step receives data from an end user system including or connected to the communication device.

4. The method of claim 1, wherein the communication device is a mobile station.

5. The method of claim 4, wherein the routing information includes a mobile country code and a mobile network code.

6. The method of claim 4, wherein the modified expanded second permanent identifier is an expanded electronic serial number of the mobile station.

7. The method of claim 1, wherein the modified expanded second permanent identifier is associated with at least a part of the communication device.

8. The method of claim 1, wherein the routing information includes a mobile country code and a mobile network code.

9. The method of claim 1, wherein the communication device forms part of a wireless communication system.

10. The method of claim 1, wherein the communication device forms part of a wireline communication system.

11. The method of claim 1, wherein the forming a modified first permanent identifier step forms the modified first permanent identifier to further include destination entity routing information indicating to which destination entity to route the first permanent identifier.

12. The method of claim 1, wherein the forming a modified expanded second permanent identifier step forms the expanded portion to further include destination entity routing information indicating to which destination entity to route the expanded second permanent identifier.

13. The method of claim 1, wherein the received data is not used to validate an end user of the communication device.

14. The method of claim 1, wherein the received data is not identification information associated with the communication device or an end user of the communication device.

15. A method of processing permanent identifiers in a mobile communication system, comprising:

storing at least one permanent identifier of a first type, permanent identifiers of the first type being expanded permanent identifiers;

receiving a permanent identifier of the first type and a permanent identifier of a second type, the received permanent identifier of the first type including identification information for the mobile communication system and data;

first determining if a predetermined portion of the received permanent identifier of the first type matches a corresponding portion in one of the stored permanent identifiers of the first type;

sending the received permanent identifiers of the first and second types to a destination entity if the first determining step determines a match exists.

16. The method of claim 15, further comprising:

storing a permanent identifier of the second type associated with each stored permanent identifier of the first type;

second determining if the received permanent identifier of the second type matches the stored permanent identifier of the second type associated with the stored permanent identifier of the first type that the first determining step determined had a corresponding portion which matched the predetermined portion of the received permanent identifier of the first type when the first determining step determines a match exists; and wherein the sending step sends the received permanent identifiers of the first and second types to a destination entity associated with the received permanent identifier of the first type when the first determining step determines a match exists and the second determining step determines that a match does not exist.

17. The method of claim 15, further comprising:

second determining if the expanded portion of the received permanent identifier of the first type matches the expanded portion of the stored permanent identifier of the first type that the first determining step determined had a corresponding portion which matched the predetermined portion of the received permanent identifier of the first type when the first determining step determines a match exists; and wherein the step sends the received permanent identifiers of the first and second types to a destination entity associated with the received permanent identifier of the first type when the first determining step determines a match exists and the second determining step determines that a match does not exist.

18. The method of claim 15, wherein the receiving step receives the permanent identifiers of the first and second types at a home system; and the received permanent identifier of the second type includes first routing information to the home system.

19. The method of claim 18, wherein the received permanent identifier of the second type further includes second routing information to a destination entity.

20. The method of claim 19, wherein the sending step sends the received permanent identifiers of the first and second types to the destination entity indicated in the second routing information.

21. The method of claim 18, wherein the received permanent identifier of the first type further includes second routing information to a destination entity.

22. The method of claim 21, wherein the sending step sends the received permanent identifiers of the first and second types to the destination entity indicated in the second routing information.

23. The method of claim 18, wherein the destination entity forms part of the home system.

24. The method of claim 18, wherein the home system forms part of a wireless communication system.

25. The method of claim 18, wherein the home system forms part of a wireline communication system.

26. The method of claim 15, further comprising:

extracting, at the destination entity, a portion of the received permanent identifiers of the first and second types as data.

27. The method of claim 15, wherein the received permanent identifier of the first type is associated with a source of the received permanent identifiers of the first and second types.

28. A method of processing a permanent identifier, comprising:

receiving a permanent identifier of a first type and a permanent identifier of the second type sent by a communication device, the permanent identifier of the, second type being an expanded permanent identifier;

extracting a portion of the permanent identifier of the first type as first data, said first data not being used to validate an end user of the communication device; and extracting part of an expanded portion of the permanent identifier of the second type as second data, said second data not being used to validate the end user of the communication device.

29. The method of claim 28, wherein the permanent identifier of the second type includes routing information.

30. The method of claim 29, wherein the received permanent identifier of the first type is associated with a source of the received permanent identifiers of the first and second types.

31. A method of processing a permanent identifier, comprising:

receiving a permanent identifier of a first type and a permanent identifier of the second type sent by a communication device, the permanent identifier of the second type being an expanded permanent identifier;

extracting a portion of the permanent identifier of the first type as first data, said first data not being identification information associated with the communication device or an end user of the communication device; and extracting part of an expanded portion of the permanent identifier of the second type as second data, said second data not being identification information associated with the communication device or an end user of the communication device.

32. A method of receiving data in a mobile communication system, comprising:

receiving a modified first permanent identifier including a first portion that includes routing information to a home system and a second portion that includes one portion of user generated data, the second portion not being an identification number of the user;

receiving a modified expanded second permanent identifier having a second permanent identifier portion and an expanded portion, the expanded portion including a second portion of user generated data, the expanded portion not being an identification number of the user;

extracting the one portion of user generated data from the received modified first permanent identifier; and extracting the second portion of user generated data from the received modified expanded second permanent identifier.

* * * * *